United States Patent
Wong et al.

(10) Patent No.: US 11,757,367 B2
(45) Date of Patent: Sep. 12, 2023

(54) FLYBACK SWITCH CIRCUIT AND CONTROL METHOD THEREOF

(71) Applicant: Joulwatt Technology Co., Ltd., Hangzhou (CN)

(72) Inventors: Pitleong Wong, Hangzhou (CN); Yang Yang, Hangzhou (CN)

(73) Assignee: JOULWATT TECHNOLOGY CO., LTD, Hangzhou (CN)

( * ) Notice: Subject to any disclaimer, the term of this patent is extended or adjusted under 35 U.S.C. 154(b) by 19 days.

(21) Appl. No.: 17/476,482

(22) Filed: Sep. 16, 2021

(65) Prior Publication Data

US 2022/0006393 A1 Jan. 6, 2022

Related U.S. Application Data

(63) Continuation-in-part of application No. 16/714,639, filed on Dec. 13, 2019, now Pat. No. 11,152,866.

(30) Foreign Application Priority Data

Sep. 2, 2021 (CN) .......................... 202111027281.6

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0058* (2021.05); *H02M 1/083* (2013.01)

(58) Field of Classification Search
CPC ............................................... H02M 3/335–42
See application file for complete search history.

(56) References Cited

U.S. PATENT DOCUMENTS

| | | | | |
|---|---|---|---|---|
| 6,396,718 B1 * | 5/2002 | Ng | ..................... | H02M 3/33546 363/41 |
| 2016/0352232 A1 * | 12/2016 | Chang | ............... | H02M 3/33523 |
| 2018/0115252 A1 * | 4/2018 | Chang | ............... | H02M 3/33592 |
| 2021/0058000 A1 * | 2/2021 | Ahmed | ............. | H02M 3/33592 |

FOREIGN PATENT DOCUMENTS

EP 2315499 A1 * 4/2011 ......... H05B 33/0815

\* cited by examiner

*Primary Examiner* — Peter M Novak
(74) *Attorney, Agent, or Firm* — Treasure IP Group, LLC

(57) ABSTRACT

A flyback switching circuit and control method thereof is disclosed, by setting a reference value greater than zero configured for controlling a turn-off time of a first transistor of the flyback switching circuit, a drain-source voltage of a main power transistor of the flyback switching circuit is consistent with the reference value greater than zero before the main power transistor is turned on, so that a turn-on power consumption of the main power transistor is reduced and a system efficiency is improved.

17 Claims, 10 Drawing Sheets

*- Prior Art -*

FLYBACK SWITCH CIRCUIT AND CONTROL METHOD THEREOF

CROSS-REFERENCE TO RELATED APPLICATION

This application is a continuation-in-part to the U.S. patent application Ser. No. 16/714,639, filed on Dec. 13, 2019, entitled "Active Clamping Flyback Circuit and Control Method Thereof". Further, this application claims priority to the Chinese Patent Application No. 201910772897.2, filed on Aug. 21, 2019, entitled "Flyback Switching Circuit and Control Method Thereof", which is incorporated herein by reference in its entirety in this disclosure.

BACKGROUND OF THE DISCLOSURE

Field of the Disclosure

The present disclosure relates to the technical field of power electronics technology, and more particularly, to a flyback switching circuit and a control method thereof.

Description of the Related Art

A flyback switching circuit includes a main power transistor, which provides energy to a load through turn-on and turn-off of the main transistor. Controlling switch state of the main power transistor is a control core of the flyback switching circuit. How to effectively control the switch state of the main power transistor to reduce turn-off loss of the main transistor is a very challenging job.

As shown in FIG. 1, an active clamping flyback circuit in a prior art is shown, which is the flyback switching circuit coupling to a clamping circuit and a clamping control circuit, the clamping circuit comprises a first capacitor and a first transistor coupling in series, one end of the first capacitor is coupling to a high voltage end of an input voltage, one end of the first transistor is coupling to a common end of a main transistor and a primary winding of a transformer. When the main transistor turns off, instantaneous spikes and high secondary harmonics at a drain terminal of the main transistor are capacitively coupling to a power supply, thus clamping a drain voltage Vdssw of the main transistor, so that the turn-off loss of the main transistor is reduced and a system efficiency is improved.

However, in the prior art, a turn-off time of the first transistor cannot be accurately controlled before the main power transistor is turned on. When the main power transistor is turned on, a voltage of a common end of the main power transistor and the primary winding may be relatively large. If the main power transistor is turned on at this time, a large energy loss generates an entire power supply system, thereby affecting the system efficiency.

For example, when system is operating in a discontinuous conduction mode (DCM), the first transistor is off in advance, and the drain voltage Vdssw of the main transistor may be dropped and restored, so that causing energy loss and the system efficiency is reduced. On the other hand, delaying turn-off may cause severity of the oscillation, or insufficient transmission of energy of this cycle, so that decreasing the system efficiency, even causing operation failure. Therefore, how to control the first transistor to be off when current of the primary winding of the transformer reaches zero is an urgent problem to be solved in the flyback active clamping circuit operating in the discontinuous conduction mode.

BRIEF DESCRIPTION OF THE DISCLOSURE

In view of this, an objective of the disclosure is to provide a flyback switching circuit and a control method thereof to adjust the off-time of the first transistor and thusly reduce a turn-on loss of the main transistor, thereby solving technical problems of large turn-on loss of the main transistor and low system efficiency in the flyback switching circuit in the prior art.

According to a first aspect of the present disclosure, there is provided an active clamping flyback circuit comprising a flyback circuit, a clamping circuit and a clamping control circuit, wherein the flyback circuit comprises a transformer, a main transistor, and a freewheeling diode or a synchronous rectifier. An output feedback circuit is coupling to an auxiliary winding of the transformer and outputs a feedback voltage through a divided voltage. The clamping circuit comprises a first capacitor and a first transistor coupling in series, wherein one end of the first capacitor is coupling to a high voltage end of an input voltage, and one end of the first transistor is coupling to a common end of the main transistor and a primary winding of the transformer. When the active clamping flyback circuit operates in a discontinuous conduction mode, the clamping control circuit starts timing when the first transistor is off, and ends timing until the feedback voltage is reduced from positive voltage to zero voltage, wherein time elapsed for the timing is a first time, and the clamping control circuit adjusts a turn-off time of next switching cycle of the first transistor so that the first time of the next switching cycle is configured to be substantially the same as a first threshold.

Optionally, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Optionally, the clamping control circuit comprises a first resistor to set the first threshold, a voltage of the first resistor indicates the oscillation period.

Optionally, the clamping control circuit comprises a comparison circuit to compare the feedback voltage to a first voltage threshold, the first voltage threshold is a zero or a near-zero voltage.

Optionally, the clamping control circuit comprises a timing circuit to start timing when the first transistor is off, and end timing until the feedback voltage is reduced from positive voltage to zero voltage, time elapsed for the timing is the first time.

Optionally, the main transistor is turned on when the feedback voltage oscillates to a valley or near the valley.

According to a second aspect of the disclosure, there is provided a control method for an active clamping flyback circuit, wherein the active clamping flyback circuit comprises a flyback circuit, a clamping circuit and a clamping control circuit. The flyback circuit comprises a transformer, a main transistor, and a freewheeling diode or a synchronous rectifier. An output feedback circuit is coupling to an auxiliary winding of the transformer and outputs a feedback voltage through a divided voltage. The clamping circuit comprises a first capacitor and a first transistor coupling in series, wherein one end of the first capacitor is coupling to a high voltage end of an input voltage, and one end of the first transistor is coupling to a common end of the main transistor and a primary winding of the transformer. The method includes: starting timing when the first transistor is off, and ending timing until the feedback voltage is reduced from a positive voltage to zero voltage, wherein time elapsed for the timing is a first time, and adjusting a turn-off time of next switching cycle of the first transistor so that the first time of the next switching cycle is configured to be substantially the same as a first threshold.

Optionally, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Optionally, the first threshold is set by a first resistor, a voltage of the first resistor indicates the oscillation period.

Optionally, the main transistor is on when the feedback voltage oscillates to a valley or near the valley.

According to a third aspect of the present disclosure, a flyback switching circuit is provided and comprises a main power transistor, a transformer and a secondary rectifying transistor, the transformer includes a primary winding and a secondary winding, the main power transistor is connected to the primary winding, and the secondary rectifying transistor is connected to the secondary winding, the flyback switching circuit further comprises:

a switch control unit and a first transistor on a primary side, the first transistor is configured to adjust a drain-source voltage of the main power transistor, and the switch control unit is configured to control a switching state of the main power transistor and a switching state of the first transistor, wherein, the switch control unit is further configured to adjust a turn-off time of the first transistor according to a reference value greater than zero to control a turn-on time voltage of the main power transistor.

Optionally, the switch control unit comprises a first bias voltage circuit and a turn-off adjustment circuit. The first bias voltage circuit is configured to output a first bias voltage signal greater than zero, and the first bias voltage signal serves as the reference value. The turn-off adjustment circuit is configured to receive the first bias voltage signal, and adjust the turn-off time of the first transistor according to the first bias voltage signal to control the turn-on time voltage of the main power transistor.

Optionally, the turn-off adjustment circuit adjusts the turn-off time of the first transistor, so that the drain-source voltage of the main power transistor is consistent with the first bias voltage signal before the main power transistor is turned on.

Optionally, the first bias voltage circuit outputs the first bias voltage signal of a predetermined value, and the predetermined value is greater than zero.

Optionally, the first bias voltage circuit outputs the adjustable first bias voltage signal, and a voltage value of the adjustable first bias voltage signal is greater than zero.

Optionally, the first bias voltage circuit receives an input voltage of the flyback switching circuit, and the adjustable first bias voltage signal is proportional to the input voltage.

Optionally, the switch control unit comprises a turn-off control circuit. The turn-off control circuit is configured to receive a first voltage signal characterizing a current of the primary winding, and compare the first voltage signal with a first reference voltage signal, and a comparison result serves a reset signal for controlling the first transistor to be turned off.

Optionally, the turn-off control circuit comprises a voltage detection circuit and an adjustment circuit. The voltage detection circuit is configured to receive the first bias voltage signal, detect a node voltage of the main power transistor, and output a voltage detection signal according to the node voltage of the main power transistor and the first bias voltage signal. The adjustment circuit is electrically connected to the turn-off control circuit and the voltage detection circuit, and is configured to adjust the turn-off time of the first transistor according to the voltage detection signal.

Optionally, the turn-off control circuit comprises a voltage detection circuit and a threshold adjustment circuit. The voltage detection circuit is configured to receive the first bias voltage signal, detect a node voltage of the main power transistor, and output a voltage detection signal according to the node voltage of the main power transistor and the first bias voltage signal. The threshold adjustment circuit is electrically connected to the voltage detection circuit and the turn-off control circuit, and the threshold adjustment circuit is configured to adjust a value of the first reference voltage signal according to the voltage detection signal, so that the turn-off time of the first transistor is adjusted.

Optionally, the switch control unit is further configured to compare the drain-source voltage of the main power transistor in a current cycle with the reference value, and adjust a pulse width of the first transistor in a next cycle adjacent to the current cycle according to a comparison result data.

Optionally, the switch control unit comprises:

a calculation circuit configured to receive a second bias voltage signal, and providing the reference value according to the second bias voltage signal, an input signal, and an output signal;

a comparison circuit configured to compare the reference value with the drain-source voltage of the main power transistor to obtain the comparison result data; and a pulse width adjustment circuit configured to adjust the pulse width of the first transistor in the next cycle according to the comparison result data, so as to control the turn-on time voltage of the main power transistor.

Optionally, a formula for the calculation circuit to provide the reference value according to the second bias voltage signal, the input signal and the output signal is:

$$V_{ZVS\_ref} = (1-k_1) * V_{s\_VIN} - k_2 * V_{s\_VO} + V_{bias},$$

wherein, $V_{ZVS\_ref}$ is the reference value, $V_{s\_VIN}$ is the input signal, $V_{s\_VO}$ is the output signal, $V_{bias}$ is the second bias voltage signal, $k_1$ is a first coefficient, and $k_2$ is a second coefficient.

Optionally, the calculation circuit is configured that the first coefficient and the second coefficient are adjustable, and the first coefficient and the second coefficient may be any values between 0% and 100%.

Optionally, further comprises a second auxiliary winding coupled to the transformer and a sampling circuit. The sampling circuit is configured to sample voltages of the second auxiliary winding to obtain a valley voltage characterizing the drain-source voltage, the input voltage and the output voltage. The voltage of the second auxiliary winding characterizes the input voltage when the main power transistor is turned on, and the voltage of the second auxiliary winding characterizes the output voltage when the main power transistor is turned off.

Optionally, the flyback switching circuit comprises a first capacitor and a clamping transistor, wherein the first capacitor and the clamping transistor are connected in series between a high potential end of an input power supply of the flyback switching circuit and a common node of the main power transistor and the primary winding, and the clamping transistor serves as the first transistor. Alternatively, the flyback switching circuit comprises a first auxiliary winding coupled to the transformer, an auxiliary transistor and a first auxiliary capacitor, the first auxiliary winding, wherein the auxiliary transistor and the first auxiliary capacitor are connected in series to form a loop, and the auxiliary transistor serves as the first transistor.

According to a forth aspect of the present disclosure, a control method of a flyback switching circuit is provided, wherein the flyback switching circuit comprises a main power transistor, a transformer, a secondary rectifying transistor, and a first transistor configured for adjusting a drain-source voltage of the main power transistor. The control method comprising: adjusting a turn-off time of the first transistor according to a reference value greater than zero to control a turn-on time voltage of the main power transistor.

Optionally, the control method of a flyback switching circuit further comprises: comparing a first voltage signal with a first reference voltage signal according to the first voltage signal characterizing a current of the primary winding, and a comparison result serves a reset signal for controlling the first transistor to be turned off; outputting a first bias voltage signal greater than zero, the first bias voltage signal serves as the reference value, adjusting the turn-off time of the first transistor according to the first bias voltage signal to control the turn-on time voltage of the main power transistor.

Optionally, the control method of a flyback switching circuit further comprises:

in a current cycle, comparing the drain-source voltage of the main power transistor with the reference value; and in a next cycle adjacent to the current cycle, adjusting a pulse width of the first transistor according to a comparison result data.

Optionally, in the control method of a flyback switching circuit, a step of obtaining the reference value comprises:

providing the reference value according to a second bias voltage signal, an input signal, and an output signal, and a formula for providing the reference value is:

$$V_{ZVS\_ref} = (1-k_1) * V_{s\_VIN} - k_2 * V_{s\_VO\_} + V_{bias},$$

wherein, $V_{ZVS\_ref}$ is the reference value, $V_{s\_VIN}$ is the input signal, $V_{s\_VO}$ is the output signal, $V_{bias}$ is the second bias voltage signal, $k_1$ is a first coefficient, and $k_2$ is a second coefficient.

Optionally, the first coefficient and the second coefficient are configured to be adjustable, and the first coefficient and the second coefficient are any values between 0% and 100%.

In the circuit structure of the present disclosure, compared with the prior art, the turn-off time of the first transistor may be adjusted by setting the reference value greater than zero, so that the drain-source voltage of the main power transistor is a preset value greater than zero before the main power transistor is turned on, thereby reducing the turn-on power consumption of the transistor and improving system efficiency.

Compared with the prior art, the circuit structure and the driving method of the disclosure has the following advantages: through starting timing from when the first transistor is off until the feedback voltage is reduced from a positive voltage to zero voltage, the time elapsed for timing is adjusted to be configured to be substantially the same as ¼ oscillation period, so that the turn-off time of the first transistor is configured to be substantially the same as a time that current of the primary winding of the transformer is crossing zero, so that reducing system losses due to advanced turn-off or delayed turn-off of the first transistor and improving the system efficiency.

DETAILED DESCRIPTION OF EMBODIMENTS OF THE DISCLOSURE

The preferred embodiments of the disclosure are described in detail below with reference to the drawings, but the disclosure is not limited to the embodiments. The disclosure is intended to cover any alternatives, modifications, equivalent methods and solutions falling within the spirit and scope of the disclosure.

In order to provide the public with a thorough understanding of the disclosure, specific details are described in detail in the following preferred embodiments of the disclosure. The disclosure may also be fully understood by those skilled in the art without a entailed description of these details.

The present disclosure is more specifically described in the following paragraphs by way of example with reference to the accompanying drawings. It should be noted that the drawings are all in a simplified form and both use non-precise proportions, and are only for convenience and clarity to assist the purpose of the embodiments of the disclosure.

According to the disclosed embodiments, a flyback switching circuit is provided and comprises a main power transistor, a transformer and a secondary rectifying transistor, wherein the transformer includes a primary winding and a secondary winding, the primary winding is connected to the primary winding, and the secondary rectifying transistor is connected to the secondary winding. The flyback switching circuit further comprises: a switch control unit and a first transistor in a primary side, the first transistor is configured to adjust a drain-source voltage of the main power transistor, and the switch control unit is configured to control a switching state of the main power transistor and a switching state of the first transistor, wherein, the switch control unit is further configured to adjust a turn-off time of the first transistor according to a reference value greater than zero to control a turn-on time voltage of the main power transistor.

Figure 9A:
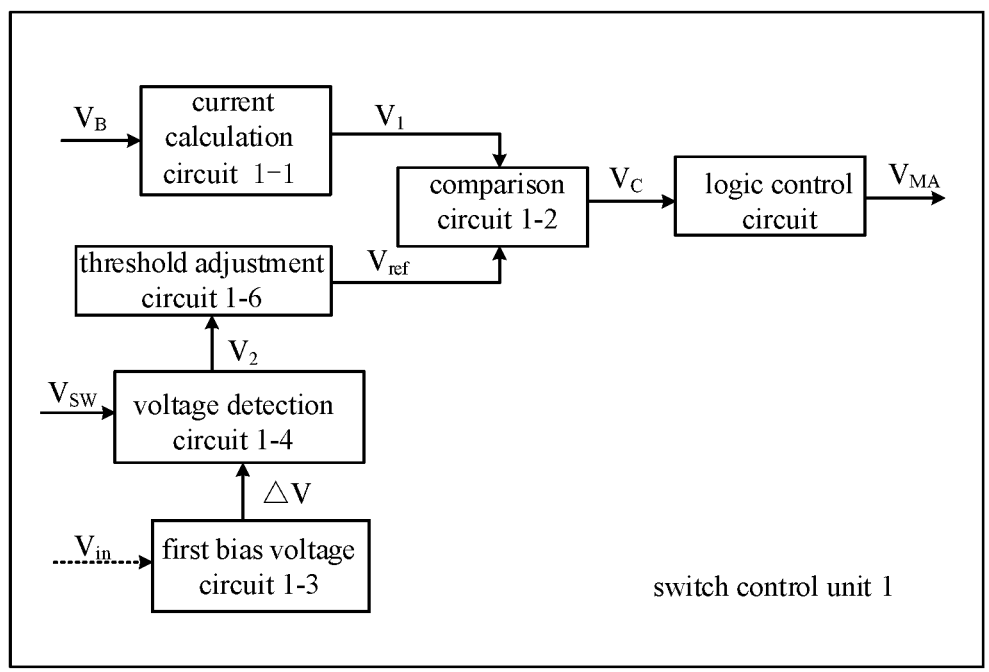
FIG. 9(a) is a circuit block diagram of a switch control unit according to a second embodiment of the present disclosure.
Figure 9B:
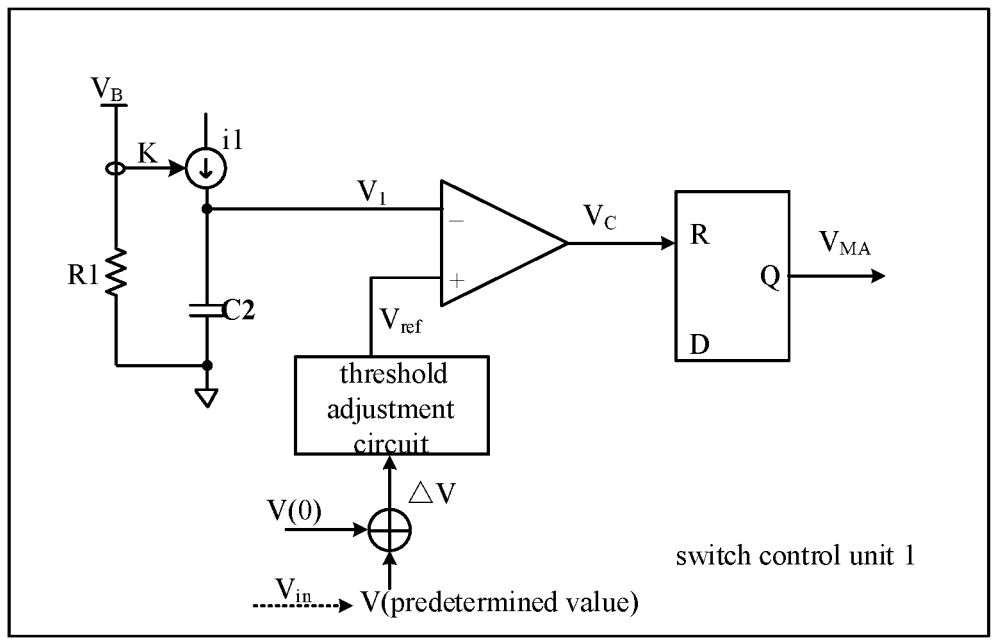
FIG. 9(b) is a circuit diagram of an embodiment of the switch control unit in FIG. 9(a)
Figure 10:
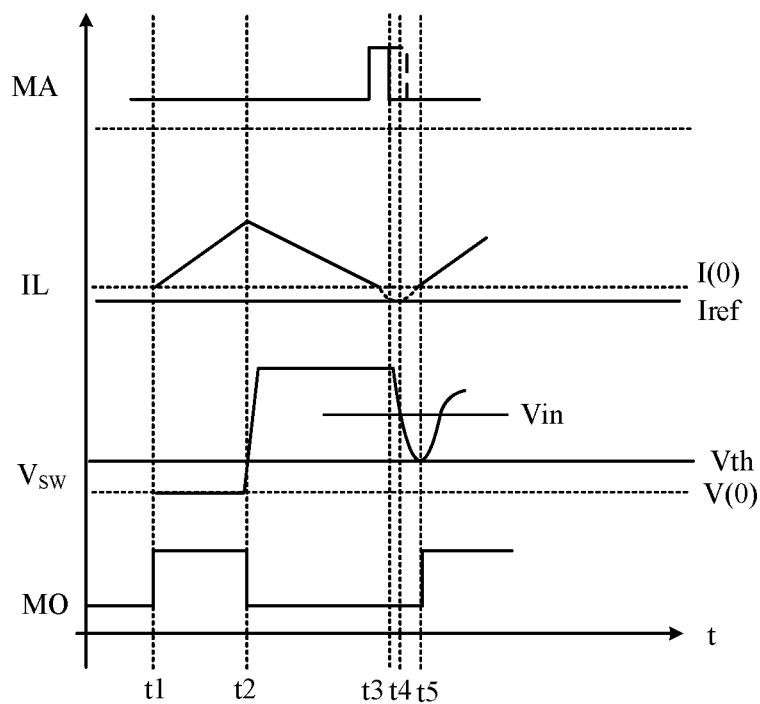
FIG. 10 is a working waveform diagram of the circuit block diagram in FIG. 8(a)
Figure 11A:
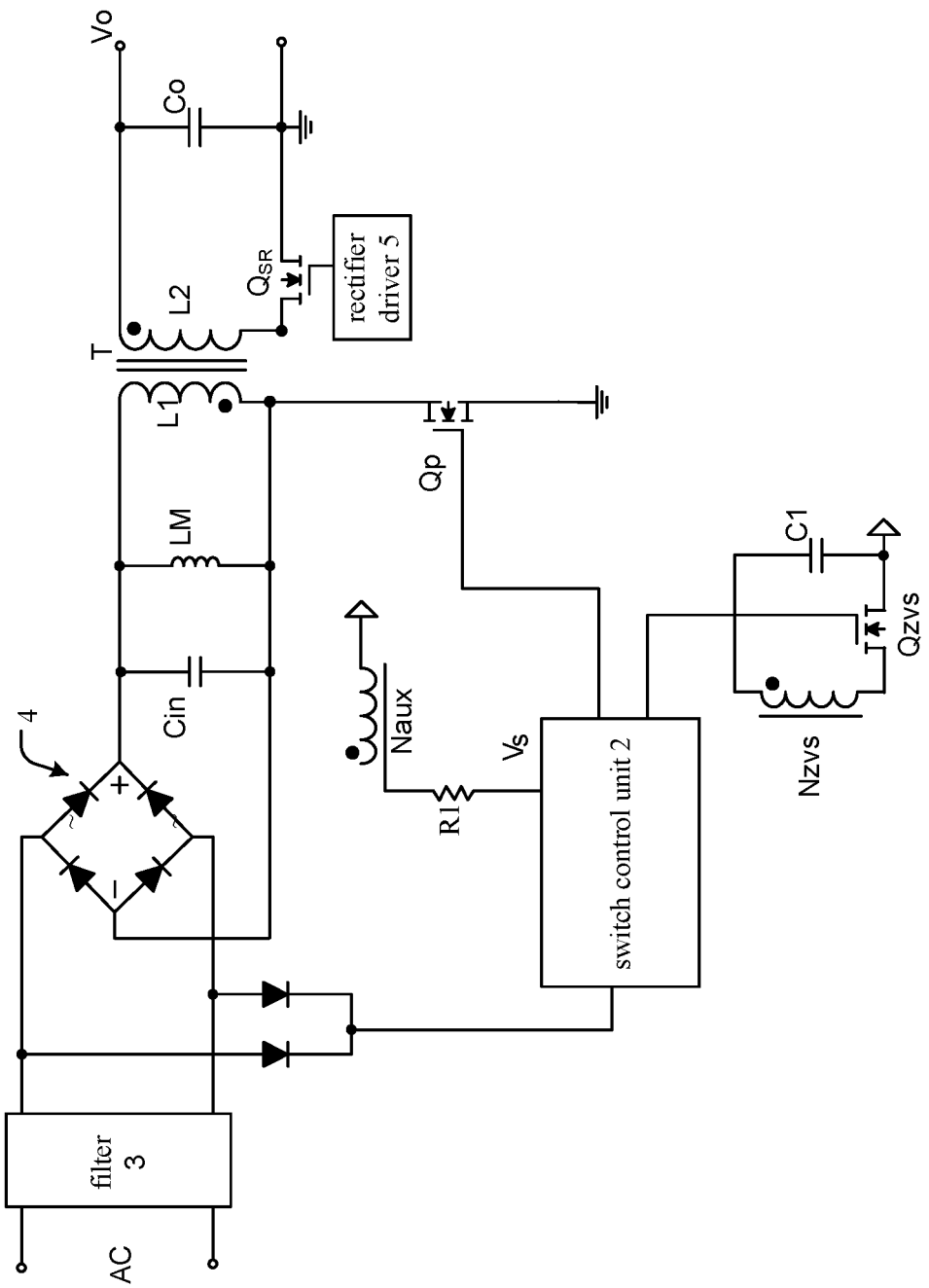
FIG. 11(a) is a circuit block diagram of a flyback switch circuit according to a third embodiment of the present disclosure.
Figure 11B:
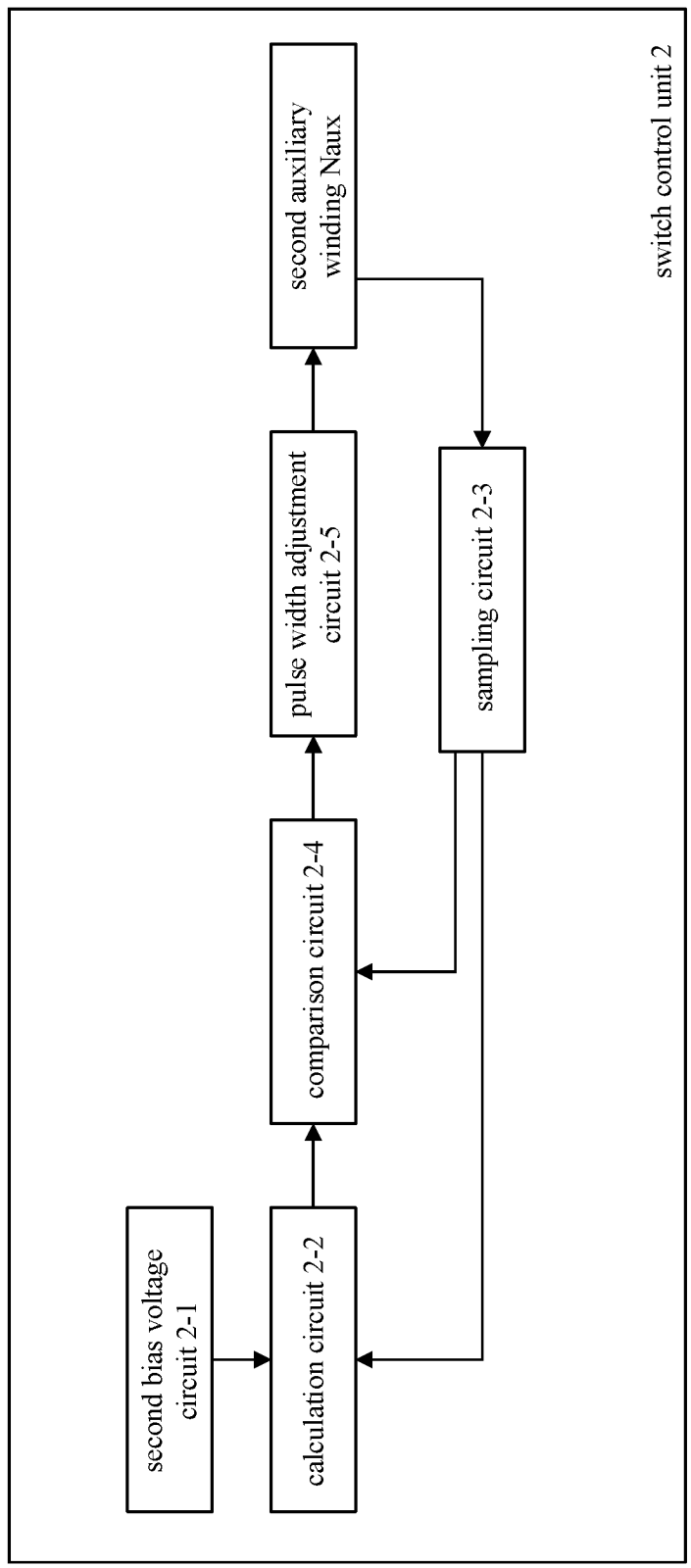
FIG. 11(b) is a block diagram of an embodiment of the switch control unit in FIG. 11(a)
Figure 11C:
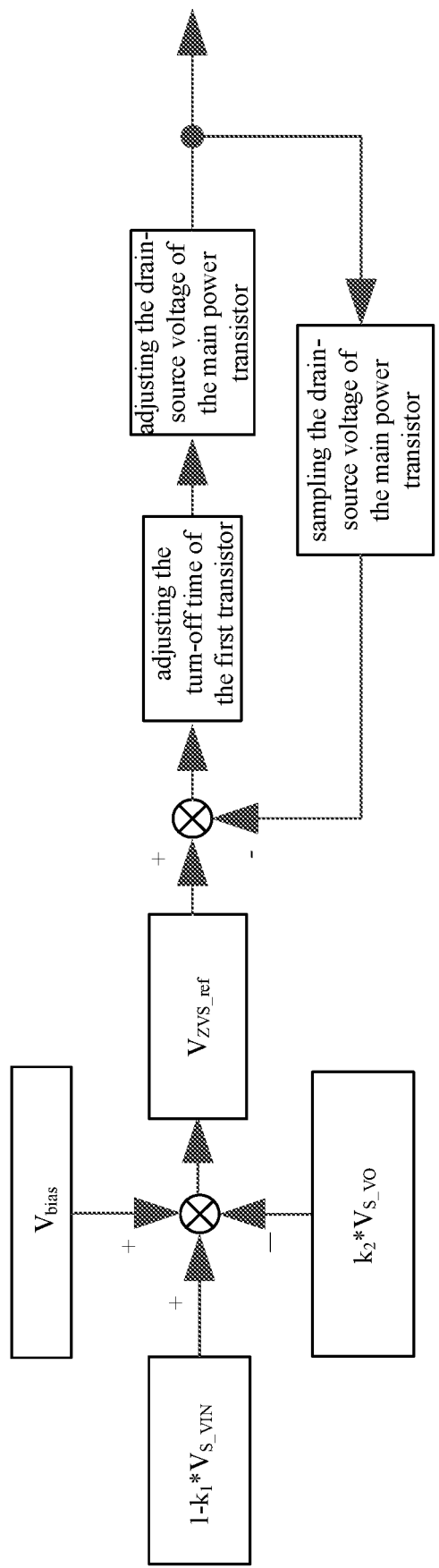
FIG. 11(c) is a control principle diagram of an embodiment of the flyback switch circuit in FIG. 11(a).

A flyback switch circuit and control method thereof provided by the present disclosure is described in detail below in conjunction with FIG. 2 to FIG. 11(c), wherein, FIGS. 2 to 6 show an active clamping flyback circuit according to a first embodiment, and FIGS. 7 to 10 show a flyback switch circuit according to a second embodiment, and FIGS. 11(a) to 11(c) shows a flyback switch circuit according to a third embodiment.

Figure 2:
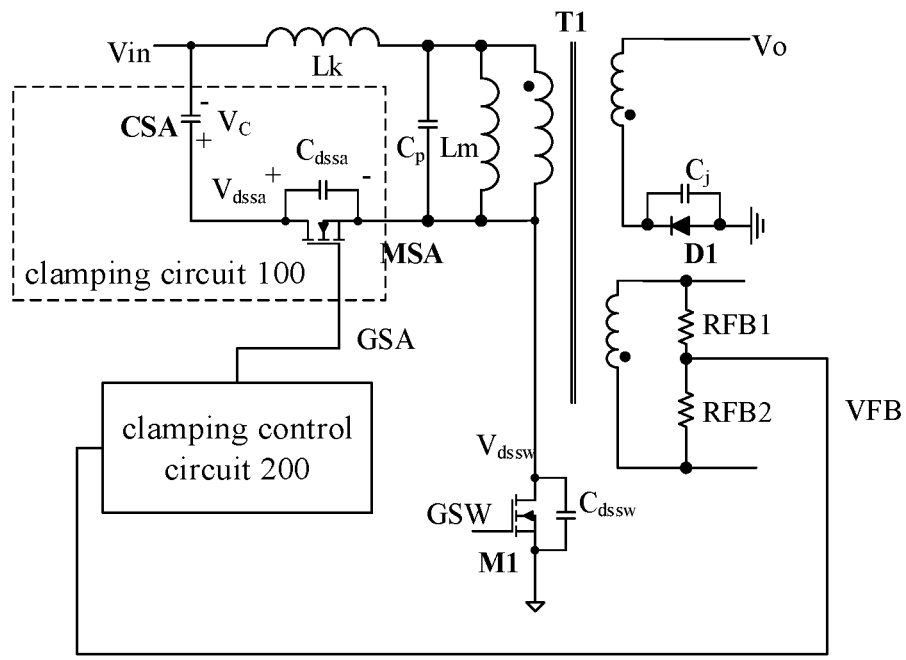
FIG. 2 is a circuit diagram of an active clamping flyback circuit according to an embodiment of the disclosure.

As shown in FIG. 2, an active clamping flyback circuit is provided in the present disclosure, which comprises a flyback circuit, a clamping circuit 100 and a clamping control circuit 200, wherein the flyback circuit comprises a transformer T1, a main transistor M1, and a freewheeling diode or a synchronous rectifier transistor D1, an output feedback circuit is coupling to an auxiliary winding of the transformer and outputs a feedback voltage VFB through a divided voltage, the output feedback circuit is coupling to the clamping control circuit 200; the clamping circuit comprises a first capacitor CSA and a first transistor MSA that are coupling in series, one end of the first capacitor CSA is coupling to a high voltage end of an input voltage Vin, one end of the first transistor MSA is coupling to a common end of the main transistor M1 and a primary winding of the transformer.

When the active clamping flyback circuit operates in a discontinuous conduction mode, the clamping control circuit starts timing when the first transistor MSA is off, and ends timing until the feedback voltage VFB is reduced from a positive voltage to a zero voltage, wherein time elapsed for the timing is a first time, and the clamping control circuit 200 adjusts turn-off time of the next switching cycle of the first transistor so that the first time of the next switching cycle configured to be substantially the same as a first threshold.

It should be noted that in FIG. 2, Lm is an equivalent magnetizing inductance of the transformer, Lk is a leakage inductance of the primary winding of the transformer, and Cp is a parasitic capacitance of the primary winding of the transformer T1; Cdssw is a drain-source parasitic capacitance of the main transistor M1, and Cdssa is a drain-source parasitic capacitance of the first transistor MSA. Voltage of the auxiliary winding is divided by voltage dividing resistors RFB1 and RFB2 to obtain a feedback voltage VFB. In other embodiments, other voltage dividing methods may be configured to obtain the feedback voltage. In FIG. 2, the freewheeling diode D1 is employed, and in other embodiments, the synchronous rectifier transistor may also be used for freewheeling.

In an embodiment, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Figure 3:
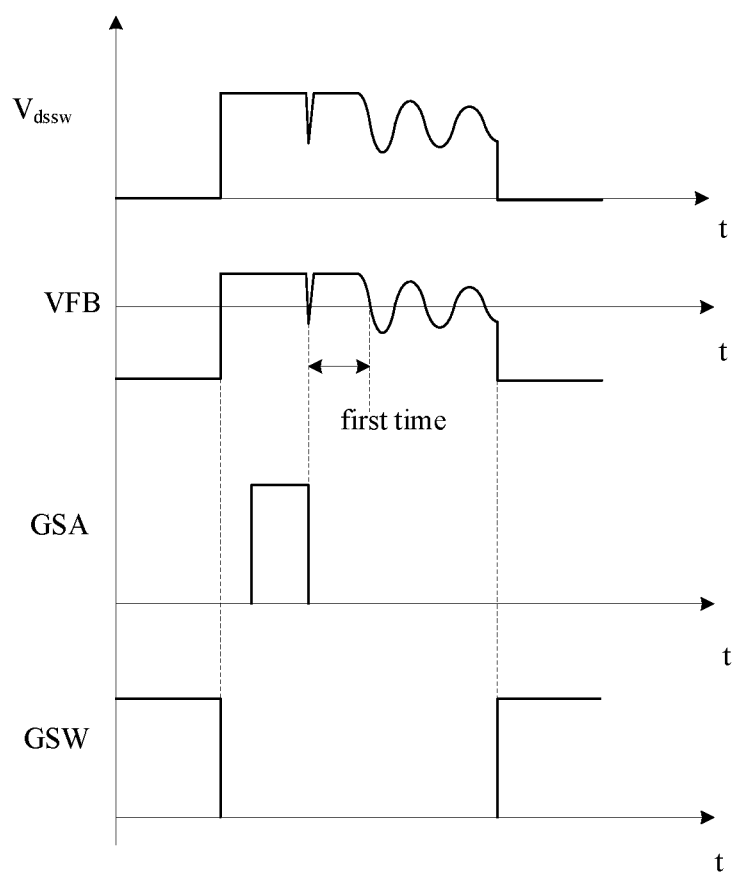
FIG. 3 shows waveforms of a DS voltage of a main transistor, a feedback voltage VFB, a driving voltage GSA of a first transistor, and a driving voltage GSW of the main transistor when the first transistor of the active clamping flyback circuit is off during a first time is greater than ¼ of a oscillation period.

As shown in FIG. 3, waveforms of a DS voltage of a main transistor, the feedback voltage VFB, a driving voltage GSA of the first transistor, and a driving voltage GSW of the main transistor when the first transistor of the active clamping flyback circuit is off during the first time is greater than ¼ of a oscillation period are illustrated; when the first transistor is off during the first time is greater than ¼ of the oscillation period, the DS voltage Vdssw of the main transistor may drop when the first transistor is off, resulting in energy loss, so that system efficiency is reduced. It should be noted that the feedback voltage VFB may cross zero when the above voltage drops, resulting the first time is misjudged. In order to prevent the first time from being misjudged, when the first transistor is off, a period of time is blanked to recover from the voltage drop, and then judge whether the feedback voltage VFB is from positive to negative.

Figure 4:
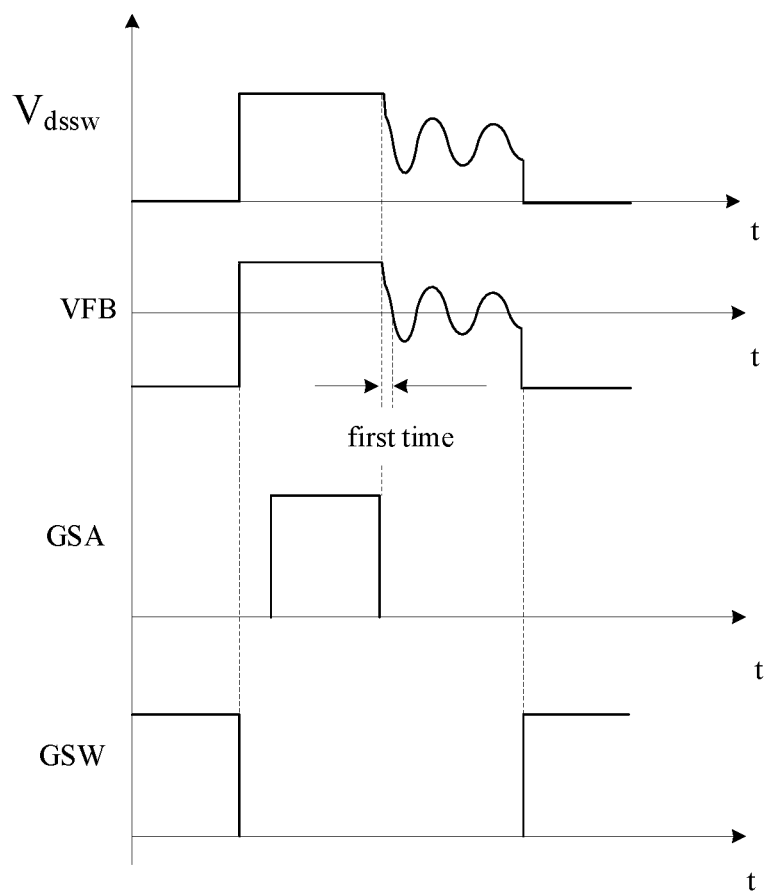
FIG. 4 shows waveforms of a DS voltage of a main transistor, a feedback voltage VFB, a driving voltage GSA of a first transistor, and a driving voltage GSW of the main transistor when the first transistor of the active clamping flyback circuit is off during a first time is smaller than ¼ of a oscillation period.

As shown in FIG. 4, waveforms of a DS voltage of a main transistor, the feedback voltage VFB, the driving voltage GSA of the first transistor, and the driving voltage GSW of the main transistor when the first transistor of the active clamping flyback circuit is off during the first time is smaller than ¼ of a oscillation period are illustrated; when the first transistor is off during the first time is smaller than ¼ of the oscillation period, the DS voltage Vdssw of the main transistor may also drop when the first transistor is off, resulting in energy loss, so that the system efficiency is reduced.

Figure 5:
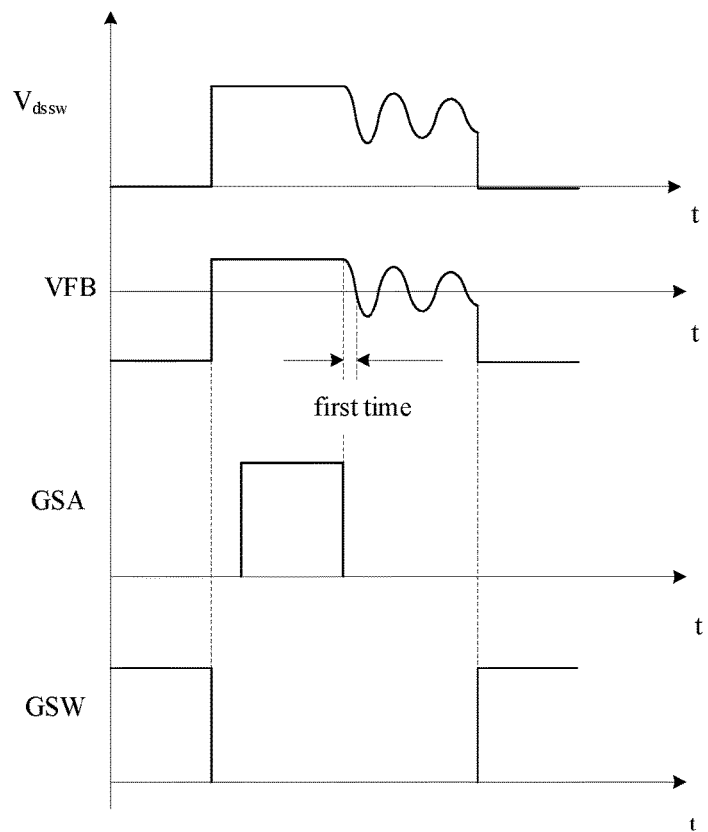
FIG. 5 shows waveforms of a DS voltage of a main transistor, a feedback voltage VFB, a driving voltage GSA of a first transistor, and a driving voltage GSW of the main transistor when the first transistor of the active clamping flyback circuit is off during a first time is equal to ¼ of a oscillation period.

As shown in FIG. 5, waveforms of a DS voltage of a main transistor, the feedback voltage VFB, the driving voltage GSA of the first transistor, and the driving voltage GSW of the main transistor when the first transistor of the active clamping flyback circuit is off during the first time is equal to ¼ of a oscillation period are illustrated; at this time, the voltage Vdssw of the main transistor DS has no voltage drop when the first transistor is off, so that there is no energy loss due to dropping.

In an embodiment, the clamping control circuit comprises a first resistor to set the first threshold, and voltage of the first resistor indicates the oscillation period. When the transformer, the first transistor and the main transistor are determined, the oscillation period generated by the oscillation of a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) is also determined. Therefore, flowing a certain current through the first resistor and adjusting the first resistor so that the voltage of the first resistor changes with the transformer, the first transistor, and the main transistor change, so that the oscillation period is indicated.

Figure 6:
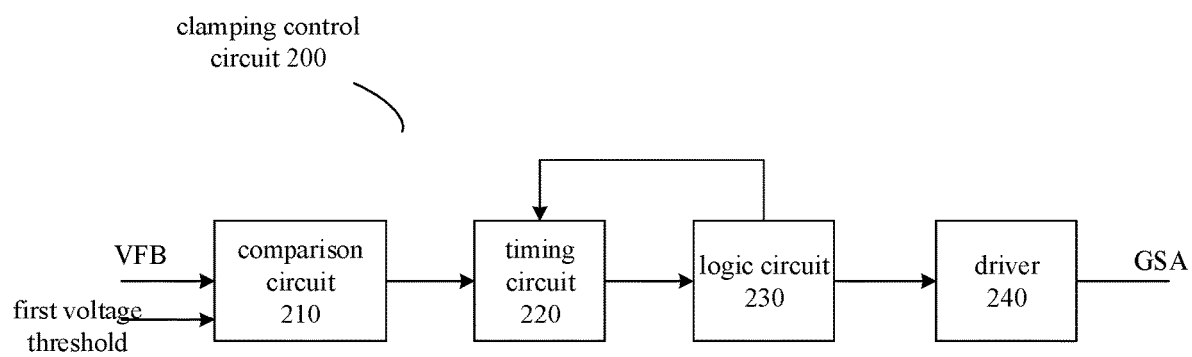
FIG. 6 is an implementation block diagram of an embodiment of a clamping control circuit.

In an embodiment, as shown in FIG. 6, a block diagram of an embodiment of the clamping control circuit is illustrated. The clamping control circuit includes a comparison circuit 210, a timing circuit 220, a logic circuit 230, and a driver 240, wherein the comparison circuit compares the feedback voltage VFB with a first voltage threshold, the first voltage threshold is a zero or a near-zero voltage (a voltage substantially the same as zero voltage); the timing circuit receives a turn-off time of the first transistor output by the logic circuit, and starts timing from when the first transistor is off, and receives an output voltage of the comparison circuit, stops timing when the feedback voltage VFB is reduced from a positive voltage to the zero voltage, wherein time elapsed for timing is the first time. The logic circuit 230 receives an output voltage of the timing circuit which indicates the first time, and compares the first time with the first threshold, for delaying the turn-off time of the first transistor in the next switching cycle when the first time is larger than the first threshold and advancing the turn-off time of the first transistor of the next switching cycle when the first time is smaller than the first threshold. The driver 240 receives on and off signals of the first transistor of the logic circuit 230, amplifies the signals, and outputs the driving voltage GSA of the first transistor.

In an embodiment, the main transistor is turned on when the feedback voltage VFB oscillates to a valley or near the valley, so that reducing the turn-on loss of the main transistor.

Figure 7:
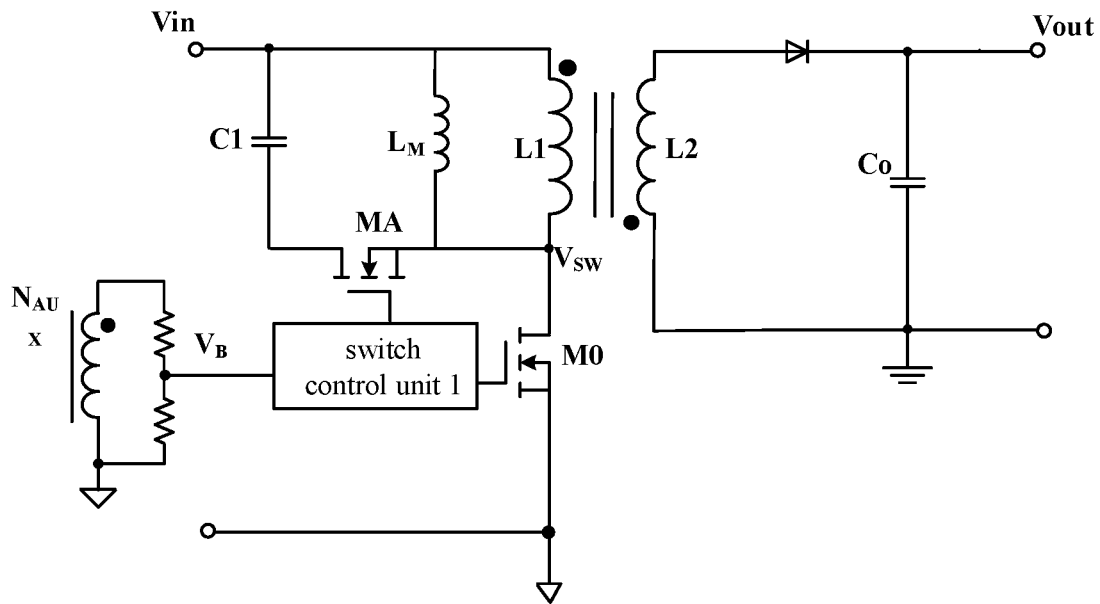
FIG. 7 is a circuit block diagram of a flyback switch circuit according to a second embodiment of the present disclosure.
Figure 8A:
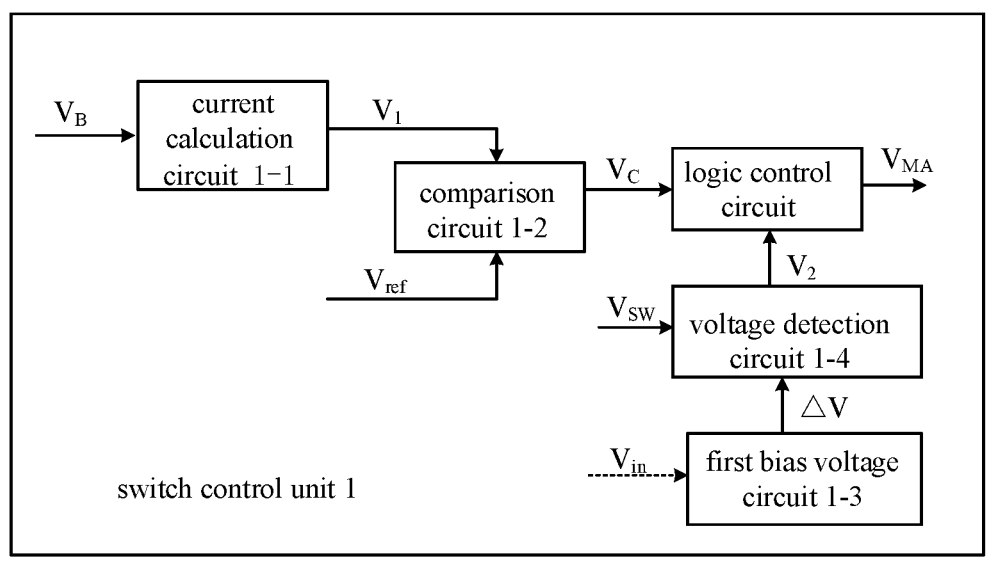
FIG. 8(a) is a circuit block diagram of a switch control unit according to a first embodiment of the present disclosure.
Figure 8B:
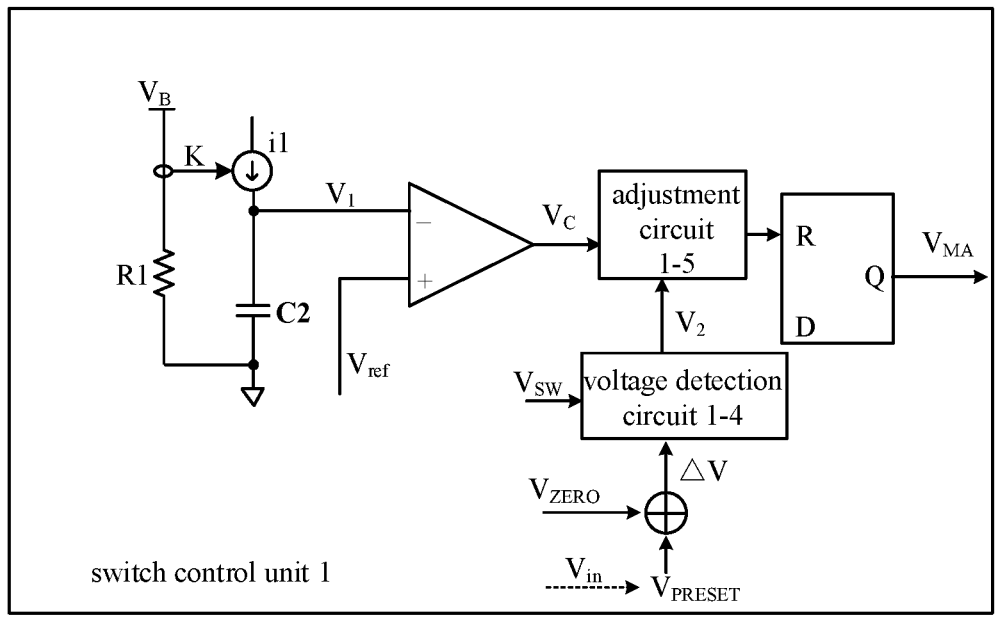
FIG. 8(b) is a circuit diagram of an embodiment of the switch control unit in FIG. 8(a)

As shown in FIG. 7, which is a circuit block diagram of the flyback switch circuit according to the second embodiment of the present disclosure, FIG. 7 shows the circuit block diagram of an active clamping flyback circuit. FIG. 8(*a*) is a circuit block diagram of a switch control unit according to a first embodiment of the present disclosure; FIG. 8(*b*) is a circuit diagram of an embodiment of the switch control unit in FIG. 8(*a*). The circuit structure of the embodiment of the present disclosure is described below in conjunction with FIGS. 7, 8(*a*) and 8(*b*). The flyback switch circuit in the embodiment of the present disclosure includes a main power transistor M0, a transformer, and a secondary rectifying transistor, the transformer includes a primary winding and a secondary winding L2, the primary winding includes a magnetizing inductance LM and a winding L1, one power end (such as the drain end) of the main power transistor is connected to the primary winding, another power end (such as the source end) is grounded, and the secondary rectifying transistor is connected to the secondary winding. The flyback switch circuit may also include a switch control unit 1 and a first transistor in a primary side. The first transistor is configured to adjust a drain-source voltage of the main power transistor, and the switch control unit is configured to control a switching state of the main power transistor and a switching state of the first transistor. In this embodiment, the flyback switch circuit may include a first capacitor C1 and a clamping transistor MA, the first capacitor and the clamping transistor are connected in series between a high potential end of an input power supply of the flyback switch circuit and a common node of the main power transistor and the primary winding, and the clamping transistor serves as the first transistor.

In an embodiment, the switch control unit may include a turn-off control circuit, and the turn-off control circuit includes a current calculation circuit 1-1, a comparison circuit 1-2, and an RD flip-flop. The current calculation circuit 1-1 is configured to receive a voltage signal VB of a first winding coupled with the primary winding, and obtain a first voltage signal V1 characterizing a current of the primary winding through calculation. Here, as shown in FIG. 8(*b*), the current calculation circuit uses volt-second balance (charge and discharge integral balance on a capacitor C2) to calculate the first voltage signal V1. Then, the comparison circuit 1-2 (for example, a comparator) compare the first voltage signal V1 with a first reference voltage signal Vref, and a comparison result serves as a reset signal for controlling the clamping transistor to turn off. The principle includes: when the main power transistor M0 is turned on and the clamping transistor MA is turned off, a voltage on the magnetizing inductance LM is Vin-VSW; when the main power transistor M0 is turned off and the clamping transistor MA is turned on, the voltage on LM is VA, and the volt-second balance of the voltage on the LM (characterized as voltage VB) is configured to determine a turn-off time of the clamping transistor MA.

In an embodiment, the switch control unit 1 includes a first bias voltage circuit 1-3 and a turn-off adjustment circuit, and the turn-off adjustment circuit includes a voltage detection circuit 1-4 and an adjustment circuit 1-5. The first bias voltage circuit is configured to output a first bias voltage signal $\Delta V$ greater than zero; the voltage detection circuit is configured to receive the first bias voltage signal $\Delta V$, detect a node voltage VSW of the main power transistor, and output a voltage detection signal V2. The adjustment circuit 1-5 is electrically connected to the turn-off control circuit and the voltage detection circuit, wherein the adjustment circuit 1-5 is connected to an output end of the comparison circuit 1-2 and the an output end of the voltage detection circuit 1-4. The adjustment circuit is configured to adjust the turn-off time of the clamping transistor MA according to the voltage detection signal V2, for example, adjust an effective time length of the comparison result according to the voltage detection signal V2, thereby adjusting the turn-off time of the clamping transistor MA. In this embodiment, the adjustment circuit 1-5 and the RD flip-flop constitute a logic control circuit, an output end of the adjustment circuit 1-5 is connected to a reset end of the RD flip-flop, and a set end of the RD flip-flop receives a signal that controls the turn-on of the clamping transistor MA, and the turn-on signal may be generated by a suitable circuit, for example, a signal for turning on the clamping transistor MA formed according to a turn-off signal of the main power transistor, which is not shown in FIG. 7. The logic control circuit outputs a signal VMA to control the switching state of the clamping transistor MA.

In an embodiment, the first bias voltage circuit is configured to output the first bias voltage signal of a predetermined value, and the predetermined value is greater than zero. For example, the first bias voltage signal $\Delta V$ is obtained by adding a voltage of a predetermined value and a zero voltage, and the first bias voltage circuit may be implemented through an adder.

In another embodiment, the first bias voltage circuit outputs an adjustable first bias voltage signal, and a voltage value of the adjustable first bias voltage signal is greater than zero. If the first bias voltage circuit receives an input voltage of the flyback switch circuit, the adjustable first bias voltage signal is proportional to the input voltage, for example, the adjustable first bias voltage signal $\Delta V$ may have a directly proportional relationship with the input voltage, wherein $\Delta V=K*Vin$, and K is a constant greater than zero and less than 1. Here, the first bias voltage circuit may be implemented through a suitable circuit structure. The adjustable first bias voltage signal $\Delta V$ is obtained by adding zero voltage with a voltage of a predetermined value through an adder, and the voltage with the predetermined value is directly proportional to the input voltage.

In an embodiment, the turn-off adjustment circuit is configured to adjust the turn-off time of the first transistor, so that before the main power transistor is turned on, the drain-source voltage of the main power transistor is consistent with the first bias voltage signal. For example, if the first bias voltage signal $\Delta V$ is set to 100 mv, the drain-source voltage of the main power transistor is adjusted to be turned on at 100 mv; alternatively, if the first bias voltage signal ΔV is set to K*Vin, the drain-source voltage of the main power transistor is adjusted to be turned on at K*Vin. Thusly, a loss of the system is controlled to be minimized, and an efficiency of the system to be maximized.

The following describes a working process of the present disclosure with reference to the working waveform diagram of FIG. 10: at time t1, the main power transistor M0 is turned on, and a current IL of the magnetizing inductance LM rises; at time t2, the main power transistor M0 is turned off, the current IL of the magnetizing inductance LM begins to decrease, and at a certain moment after the time t2, the clamping transistor MA is turned on, and the current IL of the magnetizing inductance LM begins to drop below zero; at time t3, the current IL reaches a first reference voltage signal which is represented here as a reference current signal Iref, then the clamping transistor MA is turned off, and the drain-source voltage VSW of the main power transistor M0 begins to decrease until time t4, in which the drain-source voltage VSW is equal to the input voltage Vin, and then the main power transistor M0 will be turned on. In a current working cycle, the voltage detection circuit compares the drain-source voltage VSW with the first bias voltage signal ΔV (Vth in FIG. 10), when the drain-source voltage VSW deviates from the first bias voltage signal ΔV, a voltage detection signal V2 is configured to adjust the turn-off time of the clamping transistor MA, for example, delay the turn-off time as shown by the dashed line in FIG. 10, so that in a next switching cycle, the drain-source voltage VSW at the turn-on time of the main power transistor may be consistent with the first bias voltage signal ΔV.

FIG. 9(a) is a circuit block diagram of a switch control unit according to a second embodiment of the present disclosure; FIG. 9(b) is a circuit diagram of an embodiment of the switch control unit in FIG. 9(a). In this embodiment, a topology of the flyback switch circuit still takes the switch circuit in FIG. 7 as an example. In an embodiment, the switch control unit may include a turn-off control circuit, which includes a current calculation circuit 1-1, a comparison circuit 1-2, and an RD flip-flop, wherein the RD flip-flop is a logic control circuit. The current calculation circuit 1-1 receives a voltage signal VB of the first winding coupled with the primary winding, and obtains a first voltage signal V1 characterizing a current of the primary winding through calculation. As shown in FIG. 9(b), the current calculation circuit calculate the first voltage signal V1 by use of the volt-second balance (the charge and discharge integral balance on the capacitor C2). Then, the comparison circuit 1-2 compares the first voltage signal V1 with a first reference voltage signal Vref, and the comparison result is used as a reset signal for controlling the clamping transistor to turn off.

In an embodiment, the turn-off adjustment circuit includes a voltage detection circuit 1-4 and a threshold adjustment circuit 1-6. Here, the voltage detection circuit is the same as the voltage detection circuit according to the first embodiment, so same mark is used. The voltage detection circuit 1-4 receives a first bias voltage signal, detects the node voltage of the main power transistor, and outputs a voltage detection signal V2 according to a node voltage of the main power transistor and the first bias voltage signal; the threshold adjustment circuit 1-6 is electrically connected to the voltage detection circuit 1-4 and the turn-off control circuit, wherein, the threshold adjustment circuit 1-6 is connected to an output end of the voltage detection circuit 1-4 and a connection end of the first reference voltage signal Vref of the turn-off control circuit. The threshold adjustment circuit adjusts the value of the first reference voltage signal according to the first bias voltage signal, thereby adjusting the turn-off time of the clamping transistor. Here, since the comparison result of the first voltage signal V1 with the first reference voltage signal Vref is a reset signal for controlling the turn-off of the clamping transistor, adjusting the first reference voltage signal Vref may make the turn-off of the clamping transistor be advanced or delayed. During the working process, the first reference voltage signal Vref is adjusted according to the comparison result of the drain-source voltage VSW and the first bias voltage signal ΔV in the current working cycle, when the drain-source voltage VSW deviates from the first bias voltage signal ΔV, the first reference voltage signal Vref is increased or decreased by use of a voltage bias signal, so that the turn-off time of the clamping transistor MA is adjusted, and the drain-source voltage VSW may be consistent with the first bias voltage signal ΔV in the next switching cycle, thereby improving a working efficiency of the system.

Figure 1:
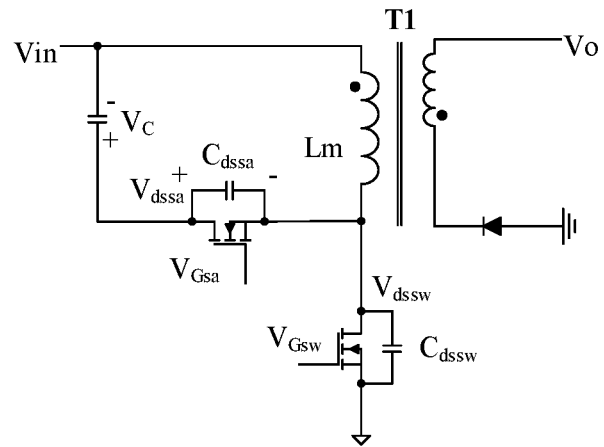
FIG. 1 is a circuit diagram of an active clamping flyback circuit.

The present disclosure further provides another flyback switching circuit to reduce switching power consumption, as shown in FIG. 11(a). FIG. 11(a) is a circuit block diagram of a flyback switch circuit according to a third embodiment of the present disclosure, FIG. 11(b) is a block diagram of an embodiment of the switch control unit in FIG. 11(a), FIG. 11(c) is a control principle diagram of an embodiment of the flyback switch circuit in FIG. 11(a). In the flyback switching circuit, the flyback switching circuit further includes a first auxiliary winding $N_{zvs}$ coupled to the transformer, an auxiliary transistor $Q_{ZVS}$, and a first auxiliary capacitor C1. The first auxiliary winding, the auxiliary transistor, and the first auxiliary capacitor is connected in series to form a loop, and a common connection end is grounded. FIG. 1, FIG. 7 and FIG. 11(a) respectively show control technology of three embodiments, and show two different first transistors, among which, the clamping transistors in FIG. 1 and FIG. 7 serve as the first transistor, and the auxiliary transistor in FIG. 11(a) serves as the first transistor. It should be understood that the flyback switch circuit of the embodiment of FIG. 11(a) may be an example of another topology controlled using the techniques shown in FIGS. 1 and 7 of the present disclosure. The flyback switch circuits of the embodiments shown in FIGS. 1 and 7 may also be examples of another topology that is controlled using the technique shown in FIG. 11(a) of the present disclosure.

As shown in FIG. 11(a), the flyback switching circuit includes a main power transistor $Q_p$, a transformer, and a secondary rectifying transistor. The transformer includes a primary winding and a secondary winding L2, the primary winding includes a magnetizing inductance LM and a primary winding L1, one power end (such as a drain end) of the main power transistor is connected to the primary winding, another power end (such as a source end) is grounded, and the secondary rectifying transistor is connected to the secondary winding. The flyback switch circuit further includes a switch control unit 2 and a first transistor on a primary side. The first transistor is configured to adjust a drain-source voltage of the main power transistor $Q_p$, the switch control unit 2 controls switching state of the main power transistor $Q_p$ and a switching state of the first transistor, wherein, the switch control unit 2 compares the drain-source voltage of the main power transistor $Q_p$ in a current cycle with a reference value, and adjusts a pulse width of the first switch in a next cycle adjacent to the current cycle according to a comparison result data.

The flyback switching circuit further includes a first auxiliary winding $N_{zvs}$ coupled to the transforme, an auxiliary transistor $Q_{ZVS}$ and a first auxiliary capacitor C1r. The first auxiliary winding $N_{zvs}$, the auxiliary transistor $Q_{ZVS}$ and the first auxiliary capacitor C1 are connected in series to form a loop, and the auxiliary transistor $Q_{ZVS}$ is used as a zero voltage switch (Zero Voltage Switch, can be referred to as ZVS), and serves as the above-mentioned first transistor. The switch control unit 2 on the primary side is configured to compare the drain-source voltage of the main power transistor $Q_p$ in the current cycle with the reference value, and adjust the auxiliary switch $Q_{ZVS}$ in the next cycle adjacent to the current cycle according to the comparison result data, wherein, the reference value is a bottom tracking reference value that may achieve zero-voltage switching of the main power transistor $Q_p$.

As an example, referring to FIG. 11(b), the switch control unit 2 includes a second bias circuit 2-1, a calculation circuit 2-2, a sampling circuit 2-3, a comparison circuit 2-4, and a pulse width adjustment circuit 2-5. The second bias voltage circuit 2-1 is configured to provide a second bias voltage signal $V_{bias}$; the calculation circuit 2-2 is connected to the second bias voltage circuit 2-1 for providing a reference value $V_{ZVS\_ref}$ according to the second bias voltage signal $V_{bias}$, an input signal $V_{s\_VIN}$ and an output signal $V_{s\_VO}$; the sampling circuit 2-3 is configured to sample the drain-source voltage of the main power transistor $Q_p$; the comparison circuit 2-4 is respectively connected to an output end of the calculation circuit 2-2 and an output end of the sampling circuit 2-3, and is configured to compare the reference value $V_{ZVS\_ref}$ with the drain-source voltage to obtain the comparison result data; the pulse width adjustment circuit 2-5 is connected to an output end of the comparison circuit 2-4, and an output end of the pulse width adjustment circuit 2-5 is connected to a control end of the auxiliary switch $Q_{ZVS}$ for adjusting the pulse width of the auxiliary switch $Q_{ZVS}$ in the next cycle according to the comparison result data, so as to adjust the drain-source voltage of the main power transistor $Q_p$.

In this example, the flyback switch circuit further includes a second auxiliary winding Naux coupled to the transformer. The sampling circuit 2-3 is connected to one end of the second auxiliary winding Naux, for sampling the voltage Vs of the second auxiliary winding Naux to obtain a valley voltage, and the valley voltage of the second auxiliary winding Naux is used to characterize the drain-source voltage of the main power transistor $Q_p$. It should be understood that the present disclosure is not limited to this embodiment. The sampling circuit 2-3 may also be directly connected to drain-source end of the main power transistor $Q_p$ to detect the drain-source voltage of the main power transistor $Q_p$, or connected to other parts of the circuit to detect other voltages configured to characterize the drain-source voltage of the main power transistor $Q_p$.

In this example, in each cycle, the sampling circuit 2-3 is also configured to sample the voltage Vs of the second auxiliary winding Naux to obtain an input voltage $V_{s\_VIN}$ and an output voltage $V_{s\_VO}$. When the main power transistor $Q_p$ is turned on, the voltage Vs of the second auxiliary winding Naux represents the input voltage $V_{s\_VIN}$, and when the main power transistor $Q_p$ is turned off, the voltage Vs of the second auxiliary winding Naux represents the output voltage $V_{s\_VO}$.

Referring to FIG. 11(c), the control principle of the flyback switch circuit is: a reference value $V_{ZVS\_ref}$ is provided according to the second bias voltage signal $V_{bias}$, the input signal $V_{s\_VIN}$ and the output signal $V_{s\_VO}$, to obtain the drain-source voltage of the main power transistor $Q_p$; the reference value $V_{ZVS\_ref}$ is compared with the drain-source voltage to determine whether an expected voltage at a time when the main power transistor is turned on reaches a closed-loop reference; the drain-source voltage of the main power transistor $Q_p$ is adjusted according to the judgment result data. Thusly, an adaptive dynamic balance of the main power transistor $Q_p$ is realized.

In the embodiment of the present disclosure, when the valley voltage of the voltage Vs of the second auxiliary winding Naux sampled in the current period is higher than the reference value $V_{ZVS\_ref}$, that is, the expected voltage at the time when the main power transistor is turned on does not reach the closed-loop reference, a pulse width of the auxiliary switch $Q_{ZVS}$ is increased in the next cycle, reverse energy of the magnetizing inductance is increased, and thusly the valley voltage is reduced. Conversely, when the valley voltage of the voltage Vs of the second auxiliary winding Naux sampled in the current cycle is lower than the reference value $V_{ZVS\_ref}$, that is, the expected voltage at the time when the main power transistor is turned on reaches the closed-loop reference, a pulse of the auxiliary switch $Q_{ZVS}$ is reduced in the next cycle, reverse energy of the magnetizing inductance is reduced, and thusly the valley voltage is increased. The above-mentioned regulation mechanism realizes the adaptive dynamic balance of the main power transistor.

Optionally, a formula for the calculation circuit to provide the reference value according to the second bias voltage signal, the input signal and the output signal is:

$$V_{ZVS\_ref}=(1-k_1)*V_{s\_VIN}-k_2*V_{s\_VO}\pm V_{bias},$$

wherein, $V_{ZVS\_ref}$ is the reference value, $V_{s\_VIN}$ is the input signal, $V_{s\_VO}$ is the output signal, $V_{bias}$ is the second bias voltage signal, $k_1$ is a first coefficient, and $k_2$ is a second coefficient.

Optionally, the calculation circuit 2-2 is configured that the first coefficient $k_1$ and the second coefficient $k_2$ are adjustable, and the first coefficient $k_1$ and the second coefficient $k_2$ may be any values between 0% and 100%. Optionally, a voltage value of the second bias voltage signal $V_{bias}$ is not less than 0V. In this embodiment, the first coefficient $K_1$, the second coefficient $K_2$, and the second bias voltage signal $V_{bias}$ may be configured to arbitrary values so that the reference value $V_{ZVS\_ref}$ is configured to be not less than zero. When the first coefficient $K_1$ is set to 100% and the second coefficient $K_2$ is set to 0, the control technique of this embodiment is consistent with the control technique of the second embodiment shown in FIG. 7.

For example, for applications where the main power transistor is a gallium nitride (GaN) transistor, since GaN itself is required to achieve "zero" voltage turn-on, the second bias voltage signal $V_{bias}$ needs to be set to 0, the first coefficient $K_1$ needs to be set to 100%, the second coefficient $K_2$ needs to be set to 0, so that the reference value $V_{ZVS\_ref}=0$, so as to achieve an effect of zero-voltage switch for GaN applications and achieve high efficiency of the power supply system.

For another example, for applications where the main power transistor is a super junction MOS (CoolMOS), due to a nonlinearity of a time-dependent output capacitance Coss of the silicon-based transistor (MOSFET) itself, in order to achieve high system efficiency, a true zero-voltage switch is not an optimal solution for efficiency configuration, flexible configuration of the first coefficient $K_1$, the second coefficient $K_2$ and the bias voltage $V_{bias}$ is required to achieve a high efficiency ZVS control under different input voltages and different output voltages. In this embodiment, a principle of analog control is adopted, thereby not only achieving the effect of adaptive control and the high efficiency of the system, but also reducing the cost, and being compatible with various applications of various main power transistors.

It should be understood that the flyback switch circuit may also include some parts or components that are necessary or not necessary for the circuit. For example, the input end on the primary side also may include a filter 3 and a rectifier bridge 4. The filter 3 receives alternating current AC, and the rectifier bridge 4 is connected to an output end of the filter to provide the input signal of the primary side according to a filtered alternating current. In addition, the switch control unit 2 is also connected between the filter 3 and the rectifier bridge 4 via a diode to receive the filtered alternating current. For another example, a capacitor Cin and a capacitor Co are connected in parallel at both ends of the primary winding L1 and the secondary winding L2, respectively. For another example, a secondary rectifier QSR is connected to one end of the secondary winding L2, and a rectifier driver is connected to a control end of the secondary rectifier QSR.

A control method for an active clamping flyback circuit is further provided, the active clamping flyback circuit comprises a flyback circuit, a clamping circuit and a clamping control circuit, wherein the flyback circuit comprises a transformer, a main transistor, a freewheeling diode or a synchronous rectifier, an output feedback circuit is coupling to an auxiliary winding of the transformer and outputs a feedback voltage through a divided voltage, the output feedback circuit is coupling to the clamping control circuit; the clamping circuit comprises a first capacitor and a first transistor that are coupling in series, one end of the first capacitor is coupling to a high voltage end, one end of the first transistor is coupling to a common end of the main transistor and a primary winding of the transformer.

Starting timing when the first transistor is off, and ending timing until the feedback voltage is reduced from a positive voltage to a zero voltage, wherein time elapsed for the timing is a first time, and adjusting a turn-off time of the next switching cycle of the first transistor so that the first time of the next switching cycle configured to be substantially the same as a first threshold.

Optionally, the first threshold is a quarter of an oscillation period, and a sum of a magnetizing inductance and a leakage inductance of the transformer (Lm+Lk) and a sum of a drain-source parasitic capacitance of the first transistor and a drain-source parasitic capacitance of the main transistor (Cdssa+Cdssw) generate an oscillation, so that generating the oscillation period.

Optionally, the first threshold is set by a first resistor, a voltage of the first resistor indicates the oscillation period.

Optionally, the main transistor is turned on when the feedback voltage oscillates to the valley or near the valley.

Optionally, comparing a first voltage signal with a first reference voltage signal according to the first voltage signal characterizing a current of the primary winding, and a comparison result serves a reset signal for controlling the first transistor to be turned off: outputting a first bias voltage signal greater than zero, wherein the first bias voltage signal serves as the reference value, adjusting the turn-off time of the first transistor according to the first bias voltage signal to control the turn-on time voltage of the main power transistor.

Optionally, adjusting the turn-off time of the first transistor, so that the drain-source voltage of the main power transistor is consistent with the first bias voltage signal before the main power transistor is turned on.

Optionally, outputting the first bias voltage signal of a predetermined value, wherein the predetermined value is greater than zero.

Optionally, receiving an input voltage of the flyback switching circuit, outputting an adjustable first bias voltage signal, wherein the adjustable first bias voltage signal is greater than zero and is proportional to the input voltage.

Optionally, detecting a node voltage of the main power transistor, and outputting a voltage detection signal according to the first bias voltage signal and the node voltage of the main power transistor; receiving the comparison result and the voltage detection signal, and adjusting the turn-off time of the first transistor according to the voltage detection signal.

Optionally, the control method includes: in a current cycle, comparing the drain-source voltage of the main power transistor with the reference value; and in a next cycle adjacent to the current cycle, adjusting a pulse width of the first transistor according to a comparison result data.

Optionally, a step of obtaining the reference value comprises: providing the reference value according to a second bias voltage signal, an input signal, and an output signal, and a formula for providing the reference value is:

$$V_{ZVS\_ref} = (1-k_1)*V_{s\_vIN} - k_2*V_{s\_VO} + V_{bias},$$

wherein, $V_{ZVS\_ref}$ is the reference value, $V_{s\_VIN}$ is the input signal, $V_{s\_VO}$ is the output signal, $V_{bias}$ is the second bias voltage signal, $k_1$ is a first coefficient, and $k_2$ is a second coefficient.

Optionally, the first coefficient and the second coefficient are configured to be adjustable, and the first coefficient and the second coefficient may be any values between 0% and 100%.

Optionally, a voltage value of the second bias voltage signal is not less than 0V.

In addition, although the embodiments are separately illustrated and described above, for a part of the common technology, those skilled in the art can make replacements and integrations between the embodiments, and for the content that is not explicitly described in one embodiment, reference may be made to another embodiment described.

The embodiments described above do not constitute a limitation on the scope of protection of the technical solutions. Modifications, equivalent substitutions, improvements, and the like within the spirit and principles of the above embodiments are intended to be included within the scope of the technical solution.

The invention claimed is:

1. A flyback switching circuit, comprising a main power transistor, a transformer and a secondary rectifying transistor, wherein the transformer includes a primary winding and a secondary winding, the main power transistor is connected to the primary winding, and the secondary rectifying transistor is connected to the secondary winding, the flyback switching circuit further comprises:

a switch control unit and a first transistor on a primary side, the first transistor is configured to adjust a drain-source voltage of the main power transistor, and the switch control unit is configured to control a switching state of the main power transistor and a switching state of the first transistor, wherein the switch control unit comprises a first bias voltage circuit and a turn-off adjustment circuit, the first bias voltage circuit is configured to output a first bias voltage signal greater than zero, the first bias voltage signal serves as a reference value, the turn-off adjustment circuit is configured to receive the first bias voltage signal, and adjust the turn-off time of the first transistor according to the first bias voltage signal to control the turn-on time voltage of the main power transistor, so that the drain-source voltage of the main power transistor is consistent with the reference value before the main power transistor is turned on.

2. The flyback switching circuit according to claim 1, wherein the first bias voltage circuit outputs the first bias voltage signal of a predetermined value, and the predetermined value is greater than zero.

3. The flyback switching circuit according to claim 1, wherein the first bias voltage circuit outputs the adjustable first bias voltage signal, and a voltage value of the adjustable first bias voltage signal is greater than zero.

4. The flyback switching circuit according to claim 3, wherein the first bias voltage circuit receives an input voltage of the flyback switching circuit, and the adjustable first bias voltage signal is proportional to the input voltage.

5. The flyback switching circuit according to claim 4, wherein the switch control unit comprises a turn-off control circuit, the turn-off control circuit is configured to receive a first voltage signal characterizing a current of the primary winding, and compare the first voltage signal with a first reference voltage signal, and a comparison result serves a reset signal for controlling the first transistor to be turned off.

6. The flyback switching circuit according to claim 5, wherein the turn-off control circuit comprises a voltage detection circuit and an adjustment circuit, the voltage detection circuit is configured to receive the first bias voltage signal, detect a node voltage of the main power transistor, and output a voltage detection signal according to the node voltage of the main power transistor and the first bias voltage signal, the adjustment circuit is electrically connected to the turn-off control circuit and the voltage detection circuit, and the adjustment circuit is configured to adjust the turn-off time of the first transistor according to the voltage detection signal.

7. The flyback switching circuit according to claim 5, wherein the turn-off control circuit comprises a voltage detection circuit and a threshold adjustment circuit, the voltage detection circuit is configured to receive the first bias voltage signal, detect a node voltage of the main power transistor, and output a voltage detection signal according to the node voltage of the main power transistor and the first bias voltage signal, the threshold adjustment circuit is electrically connected to the voltage detection circuit and the turn-off control circuit, and the threshold adjustment circuit is configured to adjust a value of the first reference voltage signal according to the voltage detection signal, so that the turn-off time of the first transistor is adjusted.

8. The flyback switching circuit according to claim 1, wherein the switch control unit is further configured to compare the drain-source voltage of the main power transistor in a current cycle with the reference value, and adjust a pulse width of the first transistor in a next cycle adjacent to the current cycle according to a comparison result data.

9. The flyback switching circuit according to claim 8, wherein the switch control unit comprises:

a calculation circuit, configured to receive a second bias voltage signal, and provide the reference value according to the second bias voltage signal, an input signal, and an output signal;

a comparison circuit, configured to compare the reference value with the drain-source voltage of the main power transistor to obtain the comparison result data; and a pulse width adjustment circuit, configured to adjust the pulse width of the first transistor in the next cycle according to the comparison result data, so as to control the turn-on time voltage of the main power transistor.

10. The flyback switching circuit according to claim 9, wherein a formula for the calculation circuit to provide the reference value according to the second bias voltage signal, the input signal and the output signal is:

$$V_{ZVS\_ref}=(1-k_1)*V_{s\_VIN}-k_2*V_{s\_VO}+V_{bias},$$

wherein, $V_{ZVS\_ref}$ is the reference value, $V_{s\_VIN}$ is the input signal, $V_{s\_VO}$ is the output signal, $V_{bias}$ is the second bias voltage signal, $k_1$ is a first coefficient, and $k_2$ is a second coefficient.

11. The flyback switching circuit according to claim 10, wherein the calculation circuit is configured that the first coefficient and the second coefficient are adjustable, and the first coefficient and the second coefficient are any values between 0% and 100%.

12. The flyback switching circuit according to claim 10, wherein further comprises: a second auxiliary winding coupled to the transformer and a sampling circuit, wherein, the sampling circuit is configured to sample a voltage of the second auxiliary winding to obtain a valley voltage characterizing the drain-source voltage, the input voltage and the output voltage, the voltage of the second auxiliary winding characterizes the input voltage when the main power transistor is turned on, and the voltage of the second auxiliary winding characterizes the output voltage when the main power transistor is turned off.

13. The flyback switching circuit according to claim 1, wherein the flyback switching circuit comprises a first capacitor and a first transistor, the first capacitor and the first transistor are connected in series between a high potential end of an input power supply of the flyback switching circuit and a common node of the main power transistor and the primary winding, and the first transistor serves as a clamping transistor; or the flyback switching circuit comprises a first auxiliary winding coupled to the transformer, an auxiliary transistor and a first auxiliary capacitor, the first auxiliary winding, the auxiliary transistor and the first auxiliary capacitor are connected in series to form a loop, and the auxiliary transistor serves as the first transistor.

14. A control method of a flyback switching circuit, wherein the flyback switching circuit comprises a main power transistor, a transformer, a secondary rectifying transistor, and a first transistor configured for adjusting a drain-source voltage of the main power transistor, wherein, the control method comprises:

adjusting a turn-off time of the first transistor according to a reference value greater than zero to control a turn-on time voltage of the main power transistor, so that the drain-source voltage of the main power transistor is consistent with the reference value before the main power transistor is turned on; and providing the reference value according to a second bias voltage signal, an input signal, and an output signal, wherein a formula for providing the reference value is:

$$V_{ZVS\_ref} = (1-k_1)*V_{s\_VIN} - k_2*V_{s\_VO} + V_{bias},$$

wherein, $V_{ZVS\_ref}$ is the reference value, $V_{s\_VIN}$ is the input signal, $V_{s\_VO}$ is the output signal, $V_{bias}$ is the second bias voltage signal, $k_1$ is a first coefficient, and $k_2$ is a second coefficient.

15. The control method according to claim 14, further comprises: comparing a first voltage signal with a first reference voltage signal according to the first voltage signal characterizing a current of the primary winding, and a comparison result serves a reset signal for controlling the first transistor to be turned off;

outputting a first bias voltage signal greater than zero, wherein the first bias voltage signal serves as the reference value; adjusting the turn-off time of the first transistor according to the first bias voltage signal to control the turn-on time voltage of the main power transistor.

16. The control method according to claim 14, further comprises:

in a current cycle, comparing the drain-source voltage of the main power transistor with the reference value; and in a next cycle adjacent to the current cycle, adjusting a pulse width of the first transistor according to a comparison result data.

17. The control method according to claim 14, wherein the first coefficient and the second coefficient are configured to be adjustable, and the first coefficient and the second coefficient are any values between 0% and 100%.

* * * * *